UNITED STATES PATENT OFFICE 2,631,150

NITROSO FORMYL TETRAHYDROPTEROIC AMINO ACIDS THEREOF

Donna B. Cosulich, Plainfield, N. J., assignor to American Cyanamid Company, New York, N. Y., a corporation of Maine No Drawing. Application May 10, 1951, Serial No. 225,673

5 Claims. (Cl. 260—251.5)

This invention relates to new organic compounds having biological activity. More particularly, it relates to nitroso formyl tetrahydropteroylglutamic acid and related compounds and methods of preparation thereof.

In my application, Serial Number 102,947, now U. S. Patent 2,537,006, I reviewed the effect of nitrous acid on 2-amino-4-hydroxy pteridines as shown in the prior art. The prior art indicates that when nitrous acid is reacted with 2-amino-4-hydroxy pteridines the following results take place: (1) destruction of the ring system, (2) desamination of the 2-amino group, (3) simultaneous desamination in the 2-position and nitrosation of the 10-nitrogen atom of pteroic acid, (4) biological inactivation of folic acid. The prior art further shows that the reactions described above were carried out in an excess of nitrous acid at temperatures ranging from room temperature to 100° C.

In a pending application of my coworkers Brockman and Roth, Serial Number 153,294, filed March 31, 1950, there is described a method of preparing compounds having citrovorum factor activity. These compounds are prepared by reducing formyl pteroylglutamic acid and related compounds to obtain the corresponding formyl tetrahydro-pteroylglutamic acid and related compounds.

I have now found that formyl tetrahydropteroic acid and amino acid amides thereof can be nitrosated under the conditions described hereinafter to produce nitroso derivatives of formyl tetrahydropteroic acid and amino acid amides thereof. It is entirely unexpected that these compounds are active for *Leuconostoc citrovorum*, or in other words, have citrovorum factor activity since it has been reported previously (Journal of Biological Chemistry 185, 405 (1950)) that the citrovorum factor loses its activity in aqueous solution at pH 2. Shive reported in his paper "Synthetic Members of the Folinic Group" (J. A. C. S. 72, 2818, June 1950): "The activity of the synthetic material derived from folic acid is destroyed . . . by dilute nitrous acid." Since nitrous acid is also an oxidizing agent and it is reacted with products in a reduced state, it could be not foreseen that the nitrous acid would not oxidize the formyl tetrahydropteroylglutamic acid or related compounds and thus inactivate them. The exact structure of the new compounds produced by the nitrosation of formyl tetrahydropteroic acid and amino acid amides thereof has not been definitely determined as yet due to their complex nature. It is believed, however, that they may be represented by one of the following formulae:

(I) 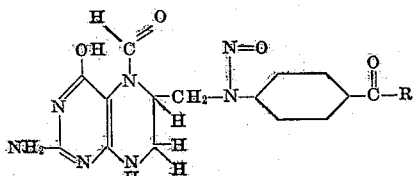

(II) 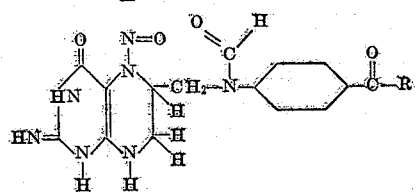

In these, R represents a hydroxyl or amino acid radical. It will be understood that both of the above may exist in tautomeric forms depending upon the conditions in which they are present.

The compounds of the present invention are prepared by reacting a formyl tetrahydropteroic acid or amino acid amide thereof with nitrous acid at an acid pH of 2 or lower. It is preferred that the nitrous acid be prepared in situ from a nitrite salt, such as an alkali metal nitrite, and an acid since nitrous acid itself is somewhat unstable and difficult to handle.

The intermediates used in the reaction of the present invention can be prepared by the reduction of formyl pteroic acid and amino acid amides thereof with hydrogen and a noble metal or by the formylation of tetrahydropteroic acid or amino acid amides thereof. The preferred intermediate is formyl tetrahydropteroylglutamic acid, and preferably 5-formyl tetrahydropteroylglutamic acid, however, other amino acid amides of pteroic acid can be used such as glycine, aspartic acid, leucine, serine, sarcosine, phenylalanine, alanine, isovaline, cystine, and the like.

The reaction of the present invention will take place over a wide range of acidity from about pH 2 down to the acidity of strong mineral acid. However, it is important that the nitrosation be carried out immediately after the starting material is placed in contact with the acid medium to avoid any isomerization of the starting product. I prefer to use a mineral acid such as hydrochloric or sulfuric at such a concentration that the intermediates will be in solution at about 0° C. The reaction is carried out by adding to the acidic solution of the intermediate a molecular equivalent of nitrous acid.

It is desirable to carry out the reaction at a temperature within the range of from −10° C. to +10° C. and preferably from about −5° C. to +5° C.

The reaction is usually completed in a matter of minutes and the end of the reaction may be determined by a test with starch iodide paper or paste in a manner familiar to those skilled in the art. In general, the nitroso formyl tetrahydropteroic acid or amino acid amide thereof precipitates from the cold solution by adjustment of the pH to 2–4 and it can be conveniently separated by filtration.

Some of the compounds of the present invention, such as nitroso formyl tetrahydropteroylglutamic acid, are useful as growth promoters of various organisms and also in the reversal of toxicity of aminopterin and other derivatives of pteroylglutamic acid which are metabolite antagonists. These properties make them of potential importance as drugs particularly in the therapy of certain leukemias.

The process and representative compounds of the invention will now be described in detail in the following examples. All parts are by weight unless otherwise indicated.

*Example 1*

About 60 parts by volume of 1.0 N hydrochloric acid cooled to 0° C. is treated with 1.03 parts of the calcium salt of formyl tetrahydropteroylglutamic acid (0.746 part of free citrovorum factor). While the calcium salt is still dissolving, addition of 0.1 N sodium nitrite is begun at once. During the titration, all material dissolves and 15.2 parts by volume of the sodium nitrite solution is absorbed as determined by a starch iodide paste test. This absorption of sodium nitrite is 95.9% of the theoretical amounts. The solution is then adjusted to pH 3–4 by the addition of dilute sodium hydroxide, whereupon a granular cream-colored precipitate appears. After filtering, washing and drying, 0.422 part of the nitroso derivative of formyl tetrahydropteroylglutamic acid is obtained. Analysis shows the presence of one nitroso group.

*Example 2*

About 185 parts by volume of 1.0 N hydrochloric acid is cooled to 0°–5° C. Then 2.5 parts of the barium salt of formyl tetrahydropteroylglutamic acid (1.375 parts of free citrovorum factor) is added and immediately the addition of 0.202 part of sodium nitrite (dissolved in 5 parts of water) is begun. During the addition complete solution results. While the solution is cooled, dilute sodium hydroxide is added to pH 2.5–3.5. After allowing to cool for some time, the cream-colored precipitate is filtered, washed and dried to yield 0.8615 part of the nitroso derivative of formyl tetrahydropteroylglutamic acid, which can be purified by recrystallization from water.

This compound melts with decomposition at 240°–245° C.; gives a positive Liebermann nitroso test and has, in 0.1 N sodium hydroxide at a concentration of 10 mg./liter, one maximum at 275 mμ. When measured as a growth factor for the organism *Leuconostoc citrovorum* it was found to be active. In the reversal of aminopterin it was found to be about three times as active as pteroylglutamic acid or its nitroso derivative.

Microanalysis of this new product gives the values calculated for the dihydrate of nitroso formyl tetrahydropteroylglutamic acid.

I claim:

1. N-(4-[2-amino-4-hydroxy-5-formyl-5,6,7,8-tetrahydropyrimido [4,5-b] pyrazyl-6-methyl-N-nitrosoamino]benzoyl) glutamic acid.

2. A method which comprises mixing together in an acid aqueous solution having a pH less than 2, at a temperature within the range of −10° C. to +10° C. N-(4-[2-amino-4-hydroxy-5-formyl-5,6,7,8-tetrahydropyrimido [4,5-b] pyrazyl-6-methylamino]benzoyl) glutamic acid and nitrous acid and after reaction thereof recovering N-(4-[2-amino-4-hydroxy-5-formyl-5,6,7,8-tetrahydropyrimido[4,5-b]pyrazyl-6-methyl-N-nitrosoamina]benzoyl)glutamic acid.

3. A compound having the formula:

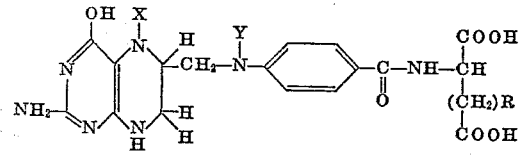

in which X and Y are members of the group consisting of formyl and nitroso radicals, one of which is a formyl radical, and R is an integer of 1 to 3, inclusive.

4. A compound having the formula:

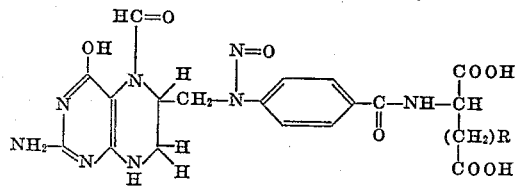

in which R is an integer of 1 to 3, inclusive.

5. A method which comprises reacting together a compound having the formula:

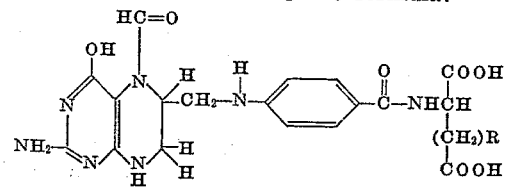

in which R is an integer of 1 to 3, inclusive, with nitrous acid in a substantially aqueous solvent at a temperature within the range of −10° C. to +10° C. and after reaction thereof recovering a compound having the formula:

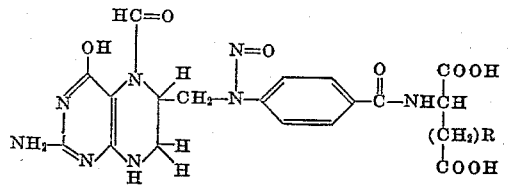

in which R is as defined above.

DONNA B. COSULICH.

No references cited.